US009257740B2

(12) United States Patent
Lyons et al.

(10) Patent No.: US 9,257,740 B2
(45) Date of Patent: Feb. 9, 2016

(54) WATCH WITH BEZEL ANTENNA CONFIGURATION

(71) Applicant: Garmin Switzerland GmbH, Schaffhausen (CH)

(72) Inventors: Justin R. Lyons, Olathe, KS (US); Todd P. Register, Olathe, KS (US); Toby C. Wilcher, Prairie Village, KS (US); Jesse R. Simpson, Overland Park, KS (US); David L. Dorris, Olathe, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 14/863,110

(22) Filed: Sep. 23, 2015

(65) Prior Publication Data

US 2016/0013544 A1 Jan. 14, 2016

Related U.S. Application Data

(63) Continuation of application No. 14/174,330, filed on Feb. 6, 2014, now Pat. No. 9,172,148.

(60) Provisional application No. 61/762,662, filed on Feb. 8, 2013.

(51) Int. Cl.
| | |
|---|---|
| *H01Q 1/24* | (2006.01) |
| *H01Q 1/27* | (2006.01) |
| *G01S 19/14* | (2010.01) |
| *G01S 19/24* | (2010.01) |
| *G04G 21/04* | (2013.01) |
| *G04G 17/02* | (2006.01) |
| *H01Q 21/28* | (2006.01) |
| *H01Q 9/30* | (2006.01) |
| *H01Q 7/08* | (2006.01) |

(52) U.S. Cl.
CPC ............... *H01Q 1/273* (2013.01); *G01S 19/14* (2013.01); *G01S 19/24* (2013.01); *G04G 17/02* (2013.01);
(Continued)

(58) Field of Classification Search
CPC ......... H01Q 1/243; H01Q 1/273; H01Q 7/08; H01Q 9/30
USPC .................. 343/702, 718, 788, 900; 702/104; 455/344, 351, 100
See application file for complete search history.

(56) References Cited

U.S. PATENT DOCUMENTS

| | | | |
|---|---|---|---|
| 5,699,319 A | 12/1997 | Skrivervik | 368/10 |
| 7,828,697 B1 | 11/2010 | Oberrieder et al. | 482/8 |

(Continued)

FOREIGN PATENT DOCUMENTS

| | | |
|---|---|---|
| EP | 0312792 | 11/1993 |
| JP | 07-059141 | 3/1995 |

(Continued)

OTHER PUBLICATIONS

U.S. Appl. No. 13/351,991, entitled Watch With Improved Ground Plane, filed Jan. 17, 2012.

(Continued)

*Primary Examiner* — Joseph Lauture
(74) *Attorney, Agent, or Firm* — Samuel M. Korte; Maxwell M. Ali

(57) ABSTRACT

A wrist-worn electronic device comprises a housing, a display, a location determining element, a first antenna, and second antenna. The housing includes a lower surface configured to contact a wearer's wrist, an opposing upper surface, and an internal cavity. The display is visible from the upper surface of the housing. The location determining element is configured to process a location signal to determine a current geolocation of the electronic device. The first antenna is positioned on the upper surface of the housing adjacent a perimeter of the display and electrically connected with the second antenna positioned at least partially within the internal cavity. The first antenna and second antenna function in cooperation to receive the location signal from a satellite-based positioning system and communicate the location signal to the location determining element.

20 Claims, 5 Drawing Sheets

(52) U.S. Cl.
CPC .............. *G04G 21/04* (2013.01); *H01Q 1/241* (2013.01); *H01Q 1/243* (2013.01); *H01Q 7/08* (2013.01); *H01Q 9/30* (2013.01); *H01Q 21/28* (2013.01)

(56) References Cited

U.S. PATENT DOCUMENTS

| | | | |
|---|---|---|---|
| 8,698,680 B2 | 4/2014 | Gutschenritter et al. | 343/718 |
| 2006/0114162 A1* | 6/2006 | Minami | G04G 21/04 343/718 |
| 2006/0227058 A1 | 10/2006 | Zellweger et al. | 343/718 |

FOREIGN PATENT DOCUMENTS

| | | |
|---|---|---|
| JP | 09-247006 | 9/1997 |
| JP | 3982918 | 9/2007 |
| KR | 10-2010-0050028 A | 5/2010 |

OTHER PUBLICATIONS

Shams, Kahn M.Z., "Study and Design of a Capacitively Coupled Polymeric Internal Antenna", University of South Carolina, Mar. 1, 2005.

International Search Report from corresponding International Application No. PCT/US2014/015586 dated May 19, 2014.

* cited by examiner

WATCH WITH BEZEL ANTENNA CONFIGURATION

RELATED APPLICATIONS

The present application is a continuation of, and claims priority benefit to, co-pending and commonly assigned U.S. non-provisional patent application entitled "WATCH WITH BEZEL ANTENNA CONFIGURATION," application Ser. No. 14/174,330, filed Feb. 6, 2014, which claims the benefit under 35 U.S.C. §119(e) of U.S. provisional patent application entitled "WATCH WITH BEZEL ANTENNA CONFIGURATION," Application Ser. No. 61/762,662, filed Feb. 8, 2013. The above applications are hereby incorporated by reference into the current application in their entirety.

BACKGROUND

Wrist-worn electronic devices often include functionality that may be used to track the wearer's current location, distance traveled, velocity, and other performance metrics or data. This functionality may be provided by receiving positional information from a satellite-based positioning system such as the global positioning system (GPS). To receive signals from GPS satellites, one or more antennas may be included in the electronic device.

SUMMARY

Antennas used to receive GPS signals for a wrist-worn electronic device are often positioned inside a device housing. The housing for conventional electronic devices is commonly composed of non-metallic materials (e.g., plastic, rubber, glass, nylon, foam, polymers, silicone, vinyl, or a combination thereof) to enable the internal antenna to receive location signals, such as GPS signals, because a non-metallic housing does not impact or interfere with electromagnetic fields around the internal antenna to the same extent as a metallic or semi-metallic housing. While these internal antennas are capable of receiving GPS signals, applicant has discovered that improved signal reception may be achieved by placing at least one antenna or a portion of an antenna on the exterior of a metallic or semi-metallic housing.

Embodiments of the present technology provide a wrist-worn electronic device with an improved antenna configuration. The electronic device broadly comprises a housing, a display, a location determining element, and a first antenna. The housing includes a lower surface configured to contact a wearer's wrist, an opposing upper surface, and an internal cavity. The display is positioned along the upper surface of the housing and is visible from the upper surface of the housing. The location determining element is configured to process location signals to determine a current geolocation of the electronic device. The first antenna is configured to receive location signals from a satellite-based positioning system and communicate location signals to the location determining element. The first antenna is positioned on the upper surface of the housing along a perimeter of the display and capacitively coupled with an electronic component positioned in the internal cavity. The first antenna may be integrated with a bezel positioned on the upper surface of the housing along a perimeter of the display.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology is described in detail below with reference to the attached drawing figures, wherein.

Figure 1:
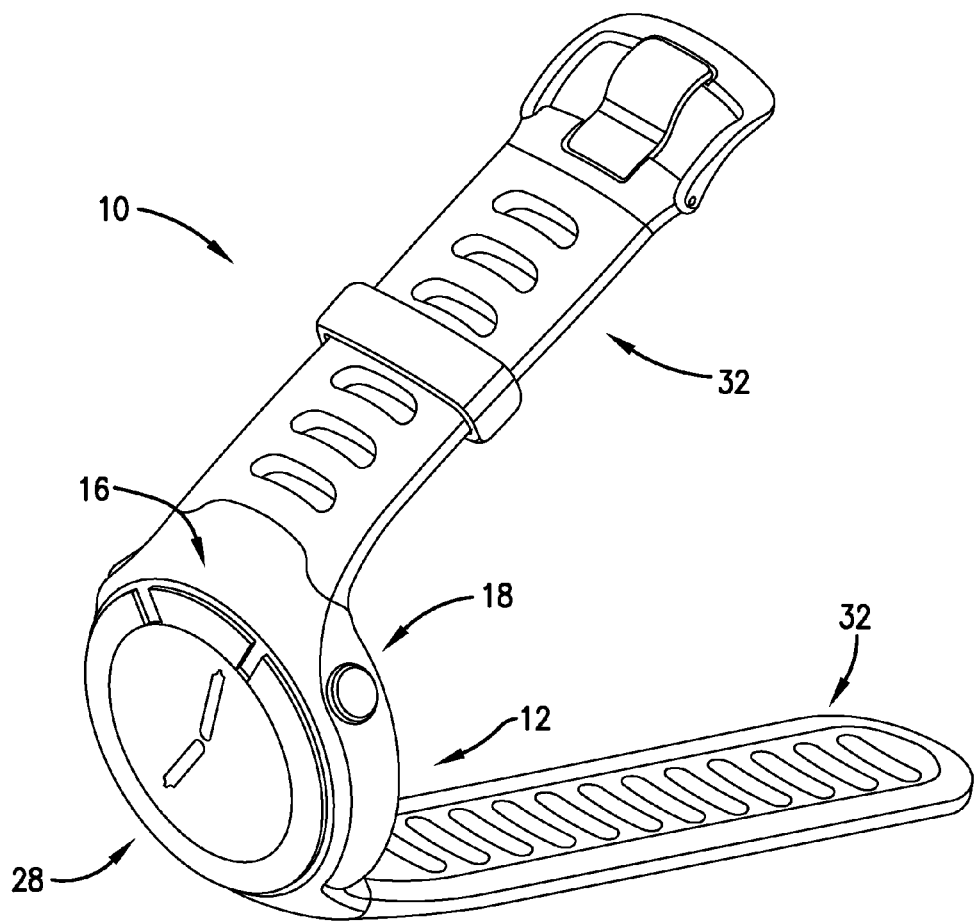
FIG. 1 is a perspective view of a wrist-worn electronic device incorporating an improved antenna configuration, constructed in accordance with embodiments of the present technology, illustrating a first antenna positioned on an outer surface of a housing.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology provide an electronic device that is worn on a user's wrist and that includes an improved antenna design. The electronic device may be a fitness watch, a wrist-worn smart phone, a wrist-worn navigation device, or other wearable multi-function electronic devices that include a housing and a wrist band, strap, or other attachment mechanism. Although the electronic device is typically worn on the wrist, the electronic device may also be worn on other parts of the body such as the forearm or the upper arm. The user wearing the electronic device may be involved in activities such as street running, trail running, jogging, hiking, walking, biking, swimming, exercising, or the like. During these activities, the electronic device may monitor the user's current location, distance traveled, velocity, and other performance metrics by receiving location signals from a satellite-based positioning system such as the global positioning system (GPS). Embodiments of the electronic device may include a pair of cooperatively coupled antennas configured to receive the location signals. A first antenna may be positioned on an upper surface on the exterior of the housing, while a second antenna may be positioned inside the housing. The first antenna may be positioned on the upper surface of the housing by integrating at least a portion of the first antenna with a bezel positioned on the upper surface of the housing or by integrating the first antenna with a bezel that is integral to the housing. The two antennas may be capacitively coupled with one another such that they cooperatively receive the location signals and communicate them to a location determining element for processing to determine the geolocation of the electronic device.

Embodiments of the technology will now be described in more detail with reference to the drawing figures. Referring initially to FIGS. 1-6, an exemplary wrist-worn electronic device 10 is illustrated. The electronic device 10 broadly comprises a housing 12, a display 14, a bezel 16, a user interface 18, a location determining element 20, a communication element 22, a processing element 24, a memory element 26, a first antenna 28, and a second antenna 30. The electronic device 10 may also include a wrist band 32, a strap, or other attachment mechanisms.

The housing 12 generally houses or retains other components of the electronic device 10 and may include or be coupled to the wrist band 32. The housing 12 may include a lower wall 34, an upper wall 36, at least one sidewall 38, and an internal cavity 40. The lower wall 34 may include a lower, outer surface that contacts the user's wrist while the user is wearing the electronic device 10. The upper wall 36 opposes the lower wall 34 and may include an upper surface of housing 12. In some embodiments, portions of the one or more sidewalls 38 may be combined with the lower wall 34 and/or the upper wall 36 to form a top case and a bottom case of housing 12. Internal cavity 40 may be formed when the separable top and bottom cases of housing 12 are combined. The top case and bottom case may be combined to form housing 12 by using an adhesive, screws or any combination thereof.

In embodiments, the bezel 16 may be integral to a portion of housing 12, such as upper wall 36. For example, bezel 16 may be integrated with the upper wall 36 and one or more sidewalls 38 such that the combination forms a single component as a top case. In embodiments, the top case may include one or more sidewalls 38 that may be combined with a bottom case to form a complete housing. A bottom case may be formed by the combination of a lower wall 34 and one or more sidewalls 38. The bezel 16 may provide an upper area of the internal cavity 40 and enclose the lens 42 and display 14 within housing 12 when the top case is secured to the bottom case. The bezel 16 may include a plurality of openings to allow screws to pass through the openings to secure the bezel 16 with other portions of the housing 12, such the sidewalls 38. Thus, the bezel 16 may function as a structural component of housing 12. In embodiments, the first antenna 28 and/or second antenna 30 may pass through the opening to position a portion of either antenna on an external surface of housing 12.

In various embodiments, the upper wall 36 may further include a circular, square, or rectangular central opening that extends from the upper surface to the internal cavity 40. The internal cavity 40 may retain components such as, but not limited to, the location determining element 20, the communication element 22, the processing element 24, the memory element 26, display 14, lens 42 and a conductive component, such as the second antenna 30. In various embodiments, the second antenna 30 may capacitively couple with the first antenna 28 integrated with at least a portion of the bezel 16 positioned on an outer surface of the upper wall 36 or sidewall 38. In some embodiments, the lower wall 34, sidewalls 38 and upper wall 36 of the housing 12 may have a round, circular, or oval shape. In other embodiments, the lower and upper walls 34, 36 may have a four-sided shape, such as a square or rectangle, or other polygonal shape, with the housing 12 including four or more sidewalls.

The display 14 generally presents the information mentioned above, such as time of day, current location, and the like. The display 14 may be implemented in one of the following technologies: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. In some embodiments, the display 14 may have a round, circular, or oval shape. In other embodiments, the display 14 may possess a square or a rectangular aspect ratio which may be viewed in either a landscape or a portrait orientation.

Figure 2:
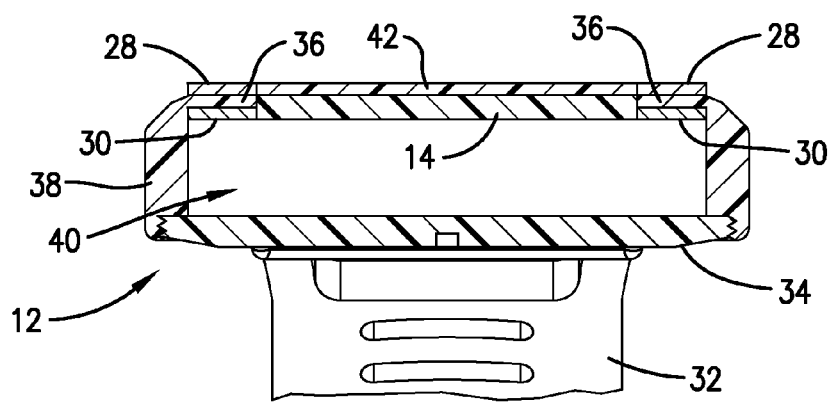
FIG. 2 is a sectional view of the electronic device of FIG. 1 cut along a vertical plane to expose a second antenna positioned within the housing.
Figure 3:
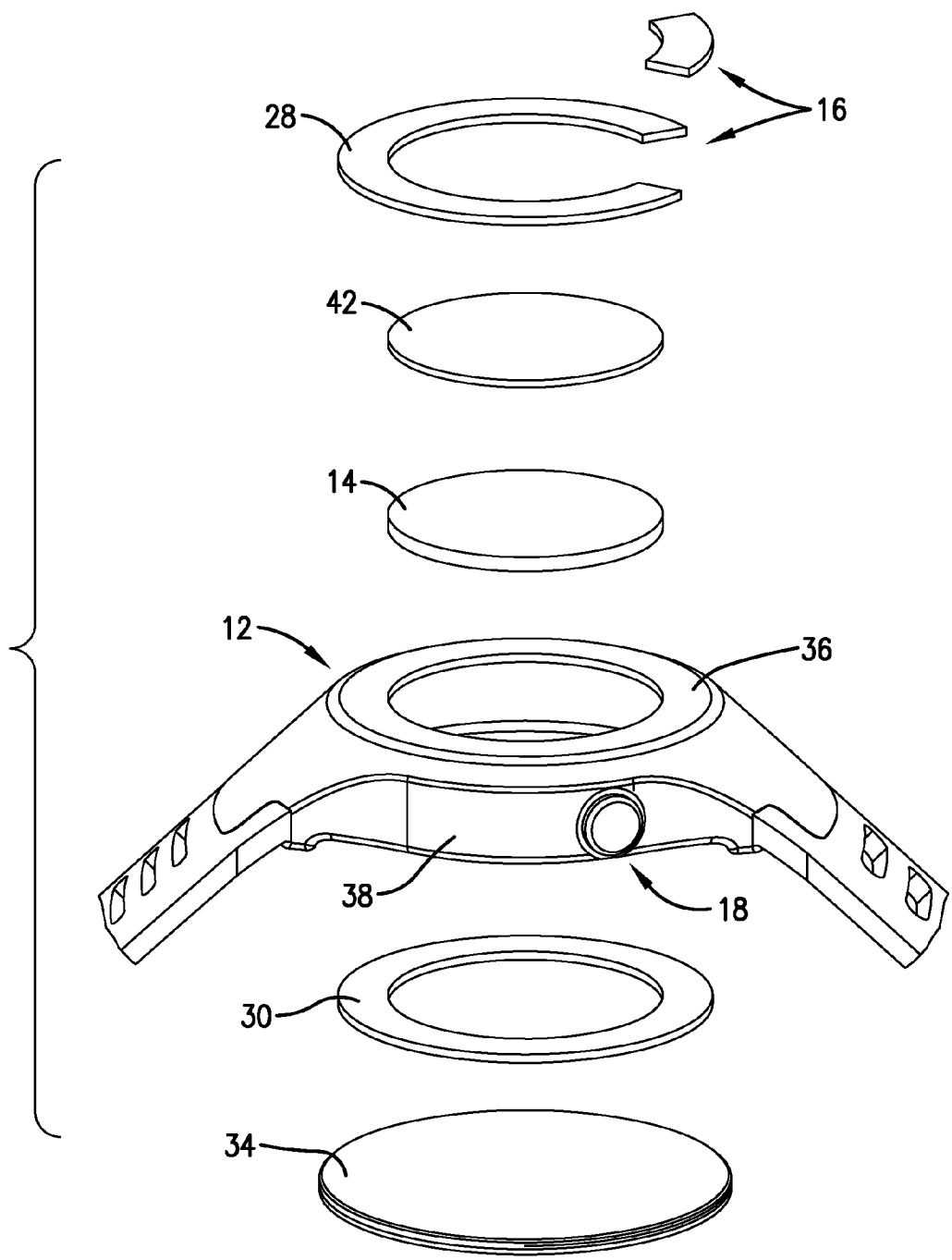
FIG. 3 is an exploded view of the electronic device of FIG. 1, illustrating the housing, the bezel, the first antenna, the second antenna, a display, and a lens.

In exemplary embodiments seen in FIG. 2, the display 14 may be at least partially positioned in the internal cavity 40 of the housing 12, such that the display 14 is flush with a circular, square, or rectangular central opening of the upper wall 36 of the housing 12 through which the display 14 may be viewed. Display 14 may be positioned along the upper surface such that its inclusion in electronic device 10 provides a substantially flat external surface of electronic device 10. The electronic device 10 may further include a lens 42 that is positioned on an upper surface of the display 14 to protect display 14 from external elements, such as moisture and physical impact, while maintaining the visibility of the information presented on the display 14.

The bezel 16 may be positioned on the upper surface of housing 12 and may generally cover the perimeter edges of the display 14 or encircle display 14. The bezel 16 may be ring-shaped to conform to the shapes of a circular or oval housing 12 and display 14 such that bezel 16 may be positioned between the perimeters of housing 12 and display 14. The bezel 16 may have an outer perimeter that is substantially the same shape as the upper wall 36 of housing 12 and an inner perimeter that is substantially the same shape as the outer perimeter of display 14. For example, the bezel 16 may have an inner edge with dimensions that are smaller than or approximately equal to the perimeter dimensions of the display 14 and an outer edge with dimensions that are approximately equal to the perimeter dimensions of the upper surface of the housing 12. Thus, the bezel 16 may be circular, square, or rectangular with a central opening through which the display 14 may be viewed. In various embodiments, the bezel 16 may be aligned with the lens 42 positioned atop the display 14. The bezel 16 may be positioned on an upper surface of housing 12 along a perimeter of the display 14.

The bezel 16 may be composed of any material that may integrate a metallic or semi-metallic material associated with a first antenna 28 and that may be positioned on or fixedly attached to an outer surface of an upper wall of a metallic or semi-metallic housing 12. Bezel 16 may be operable to receive the placement of a first antenna 28 constructed to conform to the shape and contours of bezel 16. Bezel 16 may also be integral to first antenna 28 and thereby operable to provide the functionality of first antenna 28. For example, the first antenna 28 may be placed and on fixedly attached to the upper surface of bezel 16 or the first antenna 28 may be integrated with bezel 16. Thus, bezel 16 may receive first antenna 28 or serve as first antenna 28.

In some embodiments, the bezel 16 may be integral to or fixedly secured to the housing 12 and may not rotate independent of the upper surface. In other embodiments, bezel 16 may able to rotate in place, roughly around the center of the upper surface of the housing 12. Furthermore, for embodiments in which the bezel 16 rotates roughly about the center of the upper wall 36 of the housing 12, the first antenna 28 may rotate as well. The bezel 16 may be a separate component that is placed on the upper surface of housing 12 and secured thereto. Alternatively, bezel 16 may be integral to upper wall 36 or other portion of housing 12. Bezel 16 includes a central opening through which display 14 may be positioned and viewed by a user.

The user interface 18 generally allows the user to directly interact with the electronic device 10 and may include pushbuttons, rotating knobs, or the like. In exemplary embodiments seen in FIGS. 1 and 3, the housing 12 may include one or more pushbuttons located on the sidewalls thereof that function as at least a portion of the user interface 18. In various embodiments, the display 14 may also include a touch screen occupying the entire display 14 or a portion thereof so that the display 14 functions as at least a portion of the user interface 18. The touch screen may allow the user to interact with the electronic device 10 by physically touching, swiping, or gesturing on areas of the display 14.

The location determining element 20 generally determines a current geolocation of the electronic device 10 and may process radio frequency (RF) signals from a global navigation satellite system (GNSS) such as the global positioning system (GPS) primarily used in the United States, the GLONASS system primarily used in Russia, or the Galileo system primarily used in Europe. The location determining element 20 may include satellite navigation receivers, processors, controllers, other computing devices, or combinations thereof, and memory. The location determining element 20 may process signals, referred to herein as "location signals", from one or more satellites that includes data from which geographic information such as the current geolocation is determined. The current geolocation may include coordinates, such as the latitude and longitude, of the current location of the electronic device 10. The location determining element 20 may communicate the current geolocation to the processing element 24.

Although embodiments of the location determining element 20 may include a satellite navigation receiver, it will be appreciated that other location-determining technology may be used. For example, cellular towers or any customized transmitting radio frequency towers can be used instead of satellites and may be used to determine the location of the electronic device 10 by receiving data from at least three transmitting locations and then performing basic triangulation calculations to determine the relative position of the device with respect to the transmitting locations. With such a configuration, any standard geometric triangulation algorithm can be used to determine the location of the electronic device. The location determining element 20 may also include or be coupled with a pedometer, accelerometer, compass, or other dead-reckoning components which allow it to determine the location of the electronic device 10. The location determining element 20 may determine the current geographic location through a communications network, such as by using Assisted GPS (A-GPS), or from another electronic device. The location determining element 20 may even receive location data directly from a user.

The communication element 22 generally allows communication with external systems or devices, other than GPS systems. The communication element 22 may include signal or data transmitting and receiving circuits, such as amplifiers, filters, mixers, oscillators, digital signal processors (DSPs), and the like. The communication element 22 may establish communication wirelessly by utilizing radio frequency (RF) signals and/or data that comply with communication standards such as cellular 2G, 3G, or 4G, Institute of Electrical and Electronics Engineers (IEEE) 802.11 standard such as Wi-Fi, IEEE 802.16 standard such as Wi-MAX, Bluetooth™, or combinations thereof. In addition, the communication element 22 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 22 may establish communication through connectors or couplers that receive metal conductor wires or cables or optical fiber cables. The communication element 22 may be in communication with the processing element 24 and the memory element 26.

The processing element 24 may include processors, microprocessors, microcontrollers, digital signal processors (DSPs), field-programmable gate arrays (FPGAs), analog and/or digital application-specific integrated circuits (ASICs), or the like, or combinations thereof. The processing element 24 may generally execute, process, or run instructions, code, code segments, software, firmware, programs, applications, apps, processes, services, daemons, or the like, or may step through states of a finite-state machine. The processing element 24 may be in communication with the other electronic components through serial or parallel links that include address busses, data busses, control lines, and the like.

The memory element 26 may include data storage components such as read-only memory (ROM), programmable ROM, erasable programmable ROM, random-access memory (RAM), hard disks, floppy disks, optical disks, flash memory, thumb drives, universal serial bus (USB) drives, or the like, or combinations thereof. The memory element 26 may include, or may constitute, a "computer-readable medium". The memory element 26 may store the instructions, code, code segments, software, firmware, programs, applications, apps, services, daemons, or the like that are executed by the processing element 24. The memory element 26 may also store settings, data, documents, sound files, photographs, movies, images, databases, and the like.

The first antenna 28 generally receives an RF signal, such as location signals such as GPS signals or communication signals such as Wi-Fi signals, Bluetooth signals and/or ANT signals. Accordingly, the first antenna 28 is formed from electrically conductive material, such as metal. In order to provide optimum antenna performance and reduce signal interference from the housing 12, electronic circuitry in the internal cavity 40 of housing 12 and the user's wrist, the first antenna 28 may be positioned radially outward from the center of the electronic device 10 and upward away from the internal cavity 40 of the housing 12. Thus, the first antenna 28 may be positioned on the upper surface of housing 12 on upper wall 36.

First antenna 28 is positioned on the outer surface of housing 12, such as the upper wall 36, to position the first antenna 28 to improve reception of wireless signals and reduce electromagnetic interference from electronic circuitry and the user's wrist. First antenna 28 may be positioned on the upper surface of housing 12, one or more sidewalls 38 of housing 12, or any combination thereof. Positioning first antenna 28 in such a manner exposes the first antenna 28 on an exterior surface of housing 12 and increases the separation between first antenna 28, components positioned in the internal cavity 40 of housing 12 and the user's wrist. For example, first antenna 28 may be integrated with at least a portion of a bezel 16 that is placed on the upper surface of housing 12. Alternatively, first antenna 28 may be integrated with a bezel 16 that is integral to the housing 12 such that the first antenna 28, bezel 16 and a portion of housing 12 form a single component.

Figure 5:
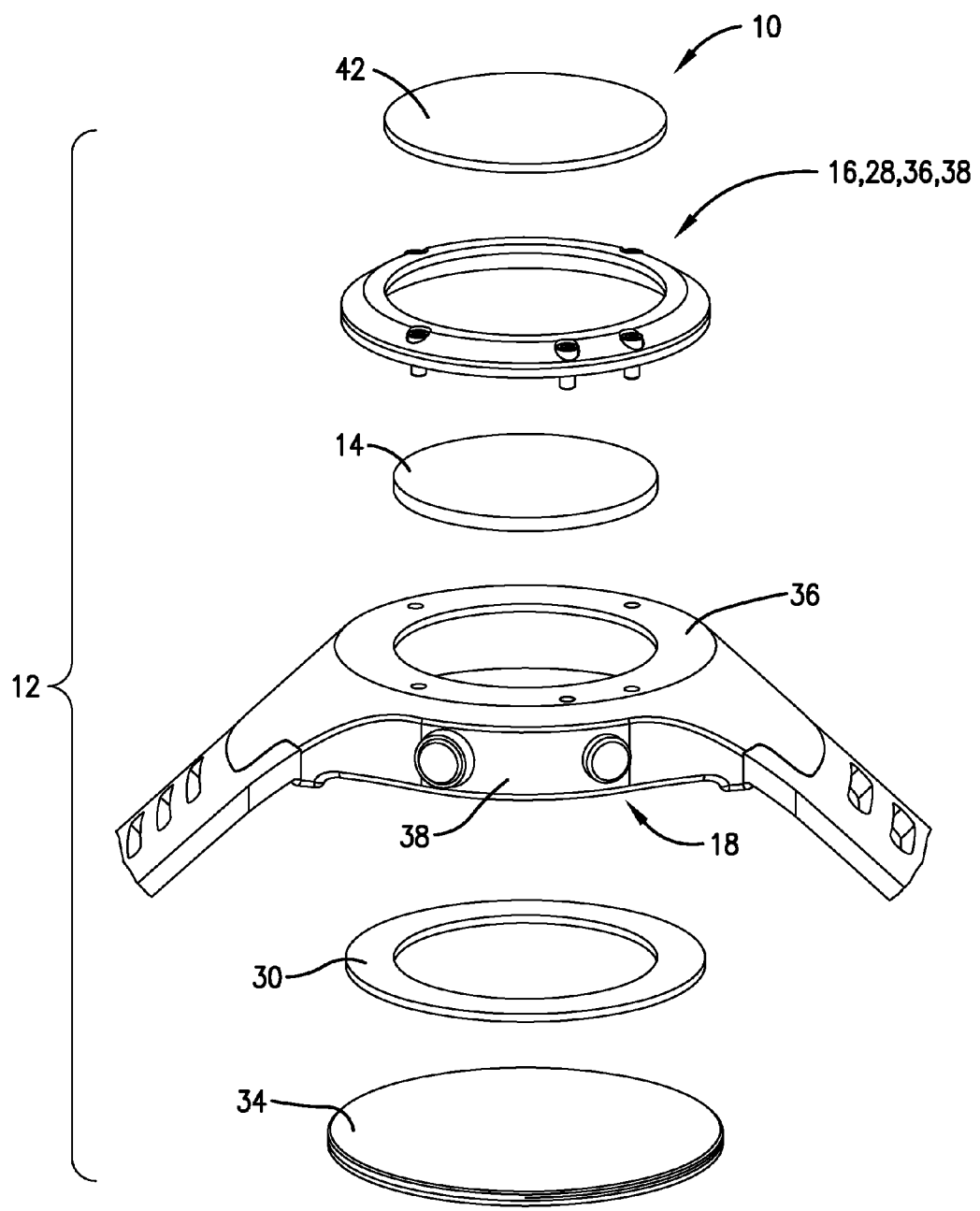
FIG. 5 is an exploded view of the electronic device of FIG. 4, illustrating the housing, the bezel, the first antenna, the second antenna, the display, and a lens.
Figure 6:
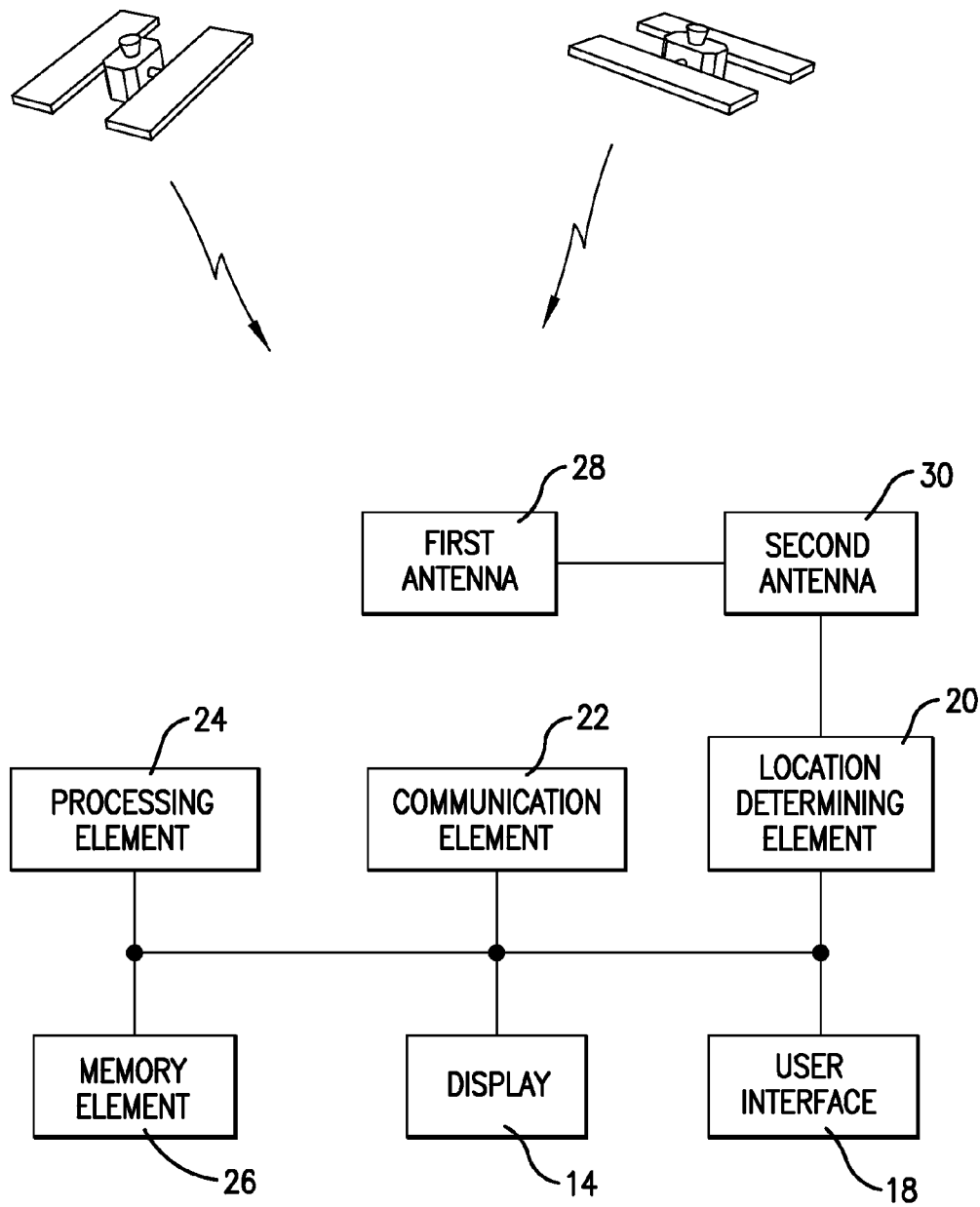
FIG. 6 is a schematic block diagram illustrating functional components of the electronic device of FIG. 1.

In various embodiments, the first antenna 28 may be integrated with the entirety of bezel 16 or only a portion of the bezel 16 circumference, depending on the length of the first antenna 28. The length, which in exemplary embodiments is roughly equal to its circumference or perimeter distance, may be determined by the width of first antenna 28 and the frequency, or alternatively the wavelength or fraction of the wavelength, of the signal to be received. The exemplary embodiment of FIG. 1 shows the first antenna 28 having an annular shape and occupying only a portion of the circumference of the bezel 16 to achieve the desired length. The exemplary embodiment of FIG. 5 shows the first antenna 28 having an annular shape of bezel 16 and thus occupying the entire circumference of bezel 16. Thus, the length of first antenna 28 may be less than or equal to circumference or perimeter distance associated with the perimeter of the bezel 16 and/or housing 12.

The width of the first antenna 28 may be the same as the bezel 16, which may be determined by the size of the display 14 and the area of the upper surface of the upper wall 36 of the housing 12. The thickness of first antenna 28 may be limited by the extent to which bezel 16 and first antenna 28 are raised from the upper wall 36 of housing 12. The shape of the first antenna 28 may be substantially similar to the shape of the bezel 16, which may be determined by the shape of the housing 12 and display 14. In exemplary embodiments seen in FIGS. 1, 3 and 5, the first antenna 28 may have an arcuate or open-ended annular shape, with an inner edge and an outer edge forming an inner circumference and an outer circumference, respectively. In other embodiments, the shape of the first antenna 28 may be a portion of or the same as a square, a rectangle, or other polygonal bezel 16. For embodiments in which the first antenna is integrated with the bezel 16 and upper wall 36, the first antenna 28 will have a width and thickness of bezel 16.

Figure 4:
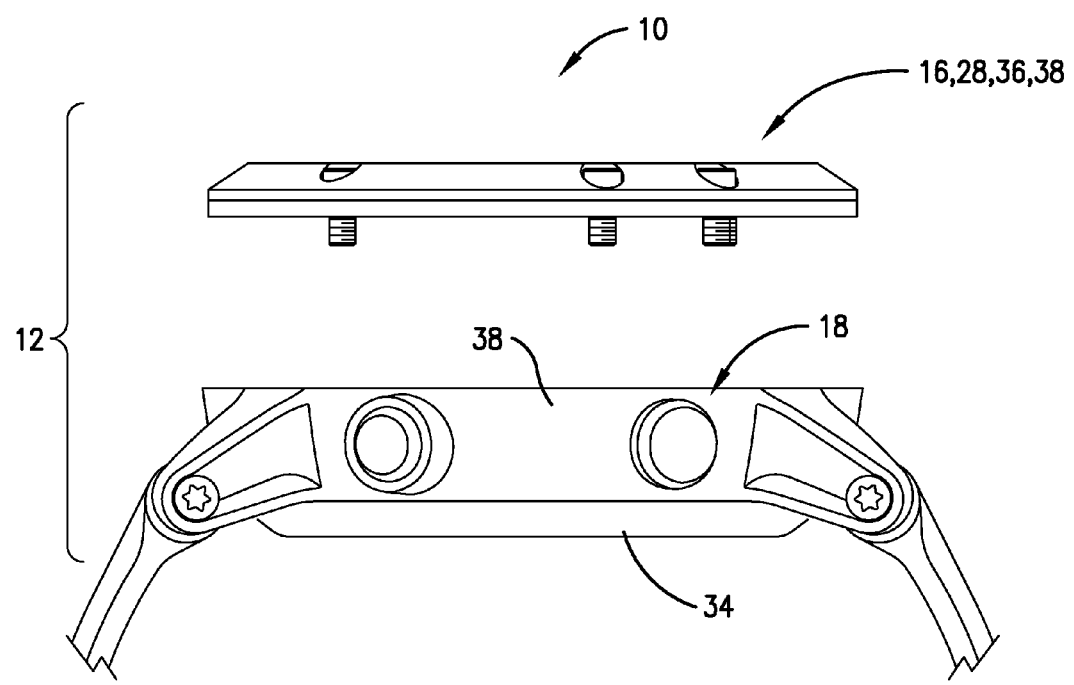
FIG. 4 is a side view of a wrist-worn electronic device incorporating an improved antenna configuration, constructed in accordance with embodiments of the present technology, illustrating a first antenna integral with a bezel.

As shown in FIGS. 4 and 5, the first antenna 28 may be integrated with a bezel 16 that integral to a portion of housing 12 of electronic device 10 such that the combination is a single component. In embodiments, first antenna 28 is integral to bezel 16 and cannot be separated from bezel 16. As stated above, the first antenna 28 is formed from an electrically conductive, metallic material. For embodiments in which the first antenna 28 is integrated with a bezel 16 integral with a housing 12, the bezel 16 and housing 12 are both formed of a metallic or semi-metallic material. In embodiments, first antenna 28 may be one or more layers of bezel 16.

The bezel 16 may include numbers and incremental marks that are etched into or engraved on the top surface of bezel 16.

As seen in FIG. 4, the first antenna 28 may be integrated with an annular-shaped, round bezel 16, upper wall 36 and one or more sidewalls 38 to form a top case. A lower wall 34 and one or more sidewalls 38 may form a bottom case. For example, a plurality of screws may pass through openings in bezel 16 and tighten into areas that may receive the screws to secure the top case with the bottom case. Thus, a first antenna 28 integrated with a bezel 16 that is integral to a housing 12 may function as a structural component of housing 12 and thereby provide an upper area of the internal cavity 40. In embodiments, one or more sidewalls 38 of the top case and may overlap with sidewalls 38 of the bottom case. For example, the top surface of the bottom case may include a ridge or raised rim along the perimeter of the top surface and the bottom surface of the top case may include a matching recess or cavity to receive the ridge or raised rim of the bottom case. In embodiments, the top case and bottom case may interlock. This configuration provides improved structural support between the top and bottom cases.

As shown in FIG. 5, the first antenna 28 is integrated with bezel 16, upper wall 36 and one or more sidewalls 38 to form a top case. The first antenna 28 may enclose a lens 42, display 14 and second antenna 30 within housing 12 when the top case is removable or permanently secured to a bottom case, which includes a lower wall 34 and one or more sidewalls 38. The sidewalls 38 of the top case and/or bottom case may include user interface 18, such as pushbuttons. The bottom case may include the second antenna 30. The second antenna 30 may be positioned in the internal cavity 40 of housing 12 such that it is on a parallel plane with the first antenna 28, vertically aligned with the first antenna 28, and positioned such that a portion of the first antenna 28 overlaps or overlies at least a portion of the second antenna 30. As seen in FIG. 5, the first antenna 28 is integrated with a bezel 16. Thus, the second antenna 30 is positioned such that at least a portion overlaps or overlies bezel 16, which is first antenna 28 in embodiments.

As shown in FIGS. 2 and 5, the second antenna 30 may be positioned in the internal cavity 40 of the housing 12 and may include patch antennas, microstrip antennas, linear antennas, or other types of antennas that can capacitively couple with the first antenna 28 and be used with a location determining component 20 and/or a communication element 22 in wrist-worn location or navigation devices. In exemplary embodiments, the second antenna 30 may be implemented as a metallic trace on a flexible printed circuit (FPC). In embodiments, a portion of the second antenna 30 may be positioned against the inner surface of the upper wall 36 of the housing to improve the capacitance between the first antenna 28 and second antenna 30. For example, an adhesive or double-sided tape may be used to secure a second antenna 30 implemented on a FPC to the upper wall 36 in internal cavity 40 of housing 12.

The second antenna 30 may generally be annular-shaped with inner and outer diameter dimensions that are similar to those of a corresponding first antenna 28 and the bezel 16 with which the first antenna 28 is at least partially integrated. The second antenna 30 may be directly or indirectly connected to a location determining component 20 and/or a communication element 22 positioned in internal cavity 40 of housing 12 such that second antenna 30 may communicate signals received by the combination of first antenna 28 and second antenna 30.

Furthermore, the second antenna 30 may be positioned in the internal cavity 40 of housing 12 such that it is on a parallel plane with the first antenna 28 vertically aligned with the first antenna 28, and positioned such that at least a portion of the first antenna 28 overlaps or overlies at least a portion of the second antenna 30 through the upper wall 36 of the housing 12, as seen in FIGS. 2 and 5. (Vertically aligned may be defined as along an axis that is transverse to a plane defined by the upper wall 36 of the housing 12.)

In exemplary embodiments, the second antenna 30 is the same shape as the first antenna 28 with roughly the same diametrical and length dimensions as the second antenna 30, and the entirety of the first antenna 28 is aligned with and overlaps the second antenna 30. For example, a first antenna 28 integrated with one-quarter of the circumference of an annular-shaped, round bezel 16 may capacitively couple with a second antenna 30 of annular shape having a length of one-quarter circumference of bezel 16 and positioned in internal cavity 40 directly below the corresponding first antenna 28.

In some embodiments, the first antenna 28 may receive signals in combination with the second antenna 30 and communicate the received signals to a component positioned in internal cavity 40. For example, the combination of first antenna 28 and second antenna 30 may receive location signals and/or communication signals and provide the received signals to the location determining element 20 and/or communication element 22. In some implementations, the first antenna 28 may be coupled with the second antenna 30 through capacitive or inductive coupling, such that there is electronic communication between the first antenna 28 and the second antenna 30. In general terms, the signal received by the first antenna 28 may induce a voltage across or current through the second antenna 30 despite the separation between the first antenna 28 and the second antenna 30. Mutual coupling effects between a plurality of closely-spaced antennas may enable use of a housing 12 that is wholly or partially composed of metallic or semi-metallic materials. In other implementations, the first antenna 28 may be connected to the second antenna 30 with electrically conductive components. The electrically conductive connection may be present through the housing 12 between the first antenna 28 and the second antenna 30. For example, wires, jumpers, vias, or pogo pins may pass through the housing 12 to electrically connect the first antenna 28 and the second antenna 30 to collectively form a single antenna to receive location signals or communication signals. As described above, a bezel 16 may be positioned on an upper surface of housing 12 and the first antenna 28 may be integrated with a portion of bezel 16. The second antenna 30 may be wholly or substantially enclosed within internal cavity 40 of the housing 12 and positioned such that it is directly or indirectly connected to the first antenna 28. In embodiments, a portion of the first antenna 28 and/or the second antenna 30 may be positioned within the internal cavity 40 of housing 12 and the upper surface of housing 12, such as on an outer surface of the upper wall 36. The first antenna 28 and the second antenna 30 may be directly connected by an adjacent or overlapping configuration of the two antennas, indirectly connected using wires, jumpers, vias or pogo pins, or any combination thereof. Typically, the one or more holes in the housing 12 through which the antennas and/or conductors may pass are sealed with a watertight coating.

In some embodiments, the first antenna 28 receives the signals and directly communicates the signals to a component positioned in internal cavity 40, such as the location determining element 20 or communication element 22. The second antenna 30 is not included in such embodiments. Typically, the location determining element 20 is positioned in the internal cavity 40 of housing 12 and may be mounted or retained on a printed circuit board (PCB), or other electrical substrate. The first antenna 28 may be connected to the PCB with electrically conductive components, such as wires, jumpers, vias, or pogo pins, that pass through the housing 12 to communicate received location signals to the location determining element 20 or communication element 22. In implementations, a portion of the first antenna 28 may pass through an opening within a wall of the housing 12 such that a first portion is positioned on one or more external surfaces of the housing 12, such as being integrated with a portion of bezel 16 on upper surface of housing 12, and a second portion of first antenna 28 is positioned in the internal cavity 40 of the housing 12. For example, first antenna 28 may be an inverted-F antenna passing from internal cavity 40, through an opening within a wall of housing 12 and positioned on an external surface of housing 12. The one or more external surfaces of housing 12 on which first antenna 28 is positioned be selected to enhance signal reception. For example, first antenna 28 may pass through an opening within a sidewall 38 and be positioned on that sidewall 38, other sidewalls 38 and/or the upper surface of housing 12. Positioning first antenna 28 in such a manner exposes the first antenna 28 along an exterior surface of housing 12 and increases the separation between first antenna 28, components positioned in the internal cavity 40 of housing 12 and the user's wrist. The signal feed and ground points of first antenna 28 may be connected to an internal printed circuit board positioned in internal cavity 40 through one or more openings in a wall, such as the upper wall, of housing 12 using conductors or portions of the first antenna 28. The one or more openings in housing 12 through which the signal feed and ground points of the first antenna 28 pass are sealed with a watertight coating. In other implementations, a second antenna 30 may be physically coupled with first antenna 28 to extend the length of first antenna 28, which passes through an opening within a wall of housing 12.

In some embodiments, two or more first antennas 28 are positioned on the upper surface of housing 12. The two or more first antennas 28 may receive location signals and communication signals and provide the received signals to the location determining element 20 and communication element 22. In some implementations, the two or more first antennas 28 are capacitively coupled with two or more second antennas 30 positioned in housing 12. The second antennas 30 may be positioned below the corresponding first antennas 28 with which they are capacitively coupled. For example, second antennas 28 may have an annular in shape and have an outer diameter and an inner diameter approximately equal to the outer diameter and the inner diameter of first antennas 28 positioned on an upper surface of housing 12. In other implementations, the two or more first antennas 28 pass through one or more openings within a housing 12 from internal cavity 40 to an upper surface of housing 12. For example, a portion of the first antennas 28 may pass through an opening within a wall of the housing 12 such that the first portions of first antennas 28 are positioned on one or more external surfaces of the housing 12 and the second portions of first antennas 28 are positioned in the internal cavity 40 of the housing 12. The first portions of first antennas 28 may be integrated with a portion of bezel 16 positioned on an upper surface of housing 12.

For example, electronic device 10 may include one first antenna 28 used receive location signals and another first antenna 28 used to receive one or more communication signals, such as Wi-Fi signals, Bluetooth signals and/or ANT signals. In implementations, the two first antennas 28 may be capacitively coupled with two second antennas 30 positioned in housing 12 having a shape and position corresponding to the first antennas 28. For example, one first antenna 28 integrated with one-quarter of the circumference of an annular-shaped, round bezel 16 may capacitively couple with a second antenna 30 of annular shape having a length of one-quarter of the circumference of bezel 16 and positioned in internal cavity 40 below the corresponding first antenna 28 such that a substantial portion of the first antenna 28 overlaps with second antenna 30. Similarly, another first antenna 28 integrated with three-quarter of the circumference of the annular-shaped, round bezel 16 may capacitively couple with a second antenna 30 of annular shape having a length of three-quarter circumference of bezel 16 and positioned in internal cavity 40 below the corresponding other first antenna 28 such that a substantial portion of the first antenna 28 overlaps with this second antenna 30. The two first antennas 28 may be positioned on and/or integrated with bezel 16 in an adjacent manner such that one first antenna 28 does not overlap with the other first antenna 28. In other implementations, the two first antennas 28 may pass through one or more openings within a housing 12 from internal cavity 40 to an upper surface of housing 12. The signal feed and ground points of both first antennas 28 may be connected to an internal printed circuit board positioned in internal cavity 40 through one or more openings in a wall, such as the upper wall, of housing 12 using conductors or portions of the first antennas 28. The one or more openings in housing 12 through which the signal feed and ground points of the two first antennas 28 pass are sealed with a watertight coating. In either implementation, the signals received by the plurality of first antennas 28, independently or in combination with a plurality of corresponding second antennas 30, may be provided to the location determining element 20 and the communication element 22.

In some embodiments, bezel 16 may integrate a first antenna 28 capacitively coupled two or more second antennas 30 positioned in internal cavity 40 for the combination to receive a plurality of signals. For example, first antenna 28 may be integrated with a bezel 16 that integral to a portion of housing 12 such that the combination is a single component and two second antennas 30 may be positioned in internal cavity 40 having shape and length characteristics to receive location signals and communications signals (e.g., Wi-Fi, Bluetooth, ANT, etc.).

Use of a bezel 16 that is placed on an upper surface of housing 12 or integral with housing 12 allows a metallic or semi-metallic material to be incorporated with the bezel 16 and/or housing 12 of the electronic device 10. The use of a metallic or semi-metallic bezel 16 and/or housing 12 provides many benefits over plastic or non-metallic components. For example, the increased stiffness provided by a metallic bezel 16, when compared with a bezel formed of a plastic or rubber material, allows for a thinner bezel 16 that may still be sufficiently durable and robust to adequately compress a sealing gasket, which may be used to make housing 12 water resistant. A plastic bezel 16 operable to provide similar mechanical strength would need to be much larger than a metallic or semi-metallic bezel 16 amongst other possible modifications. Additionally, available manufacturing processes and techniques for metal parts (forging, machining, casting, etc.) provide opportunities for surface finishes (brushing, sandblasting, polishing, painting, anodizing, etc.) that are not currently applied to a bezel 16 or housing 12 composed of a plastic or rubber material.

Use of metallic or semi-metallic materials may also provide an aesthetic benefit, in addition to providing improved mechanical and electrical characteristics. Traditionally, any bezel 18 or cover for the display 14, along with the rest of the housing 12, has been manufactured from plastic or non-metallic materials to avoid unwanted shielding or attenuation of the location signals being received from the satellite-based position system. Some wearers find the non-metallic, plastic material construction of a housing 12 to be not as durable or attractive as metallic, wrist-worn electronic devices, such as watches, and therefore do not wear the electronic devices in public settings or at social occasions. The metallic or semi-metallic bezel 16 and first antenna 28 of the current technology enable use of a wholly or partially metallic housing 12 of the electronic device 10. This may result in a more fashionable appearance for electronic device 10 so that users will wear the electronic device 10 more frequently.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A wrist-worn electronic device comprising:
    a housing including a lower surface configured to contact a wearer's wrist, an opposing upper surface, and an internal cavity;
    a display positioned along the upper surface of the housing;
    a location determining element configured to process a location signal to determine a current geolocation of the electronic device; and
    a first antenna positioned on the upper surface of the housing electrically connected to a second antenna positioned at least partially enclosed within the internal cavity.

2. The wrist-worn electronic device of claim 1, wherein the first antenna directly contacts the second antenna.

3. The wrist-worn electronic device of claim 1, further comprising an electrical wire used to electrically connect the first antenna to the second antenna.

4. The wrist-worn electronic device of claim 3, wherein the electrical wire passes through the housing.

5. The wrist-worn electronic device of claim 4, wherein the first antenna and second antenna function in cooperation to receive the location signal from a satellite-based positioning system and communicate the location signal to the location determining element.

6. The wrist-worn electronic device of claim 1, wherein the first antenna and the second antenna collectively form a single antenna.

7. The wrist-worn electronic device of claim 1, further comprising an annular bezel with an outer diameter and an inner diameter, the bezel positioned on the upper surface of the housing along a perimeter of the display, wherein the first antenna is integrated with at least a portion of the bezel.

8. The wrist-worn electronic device of claim 7, wherein the first antenna has an outer diameter and an inner diameter approximately equal to the outer diameter and the inner diameter of the bezel, but having a length that is less than a circumference of the bezel.

9. The wrist-worn electronic device of claim 7, wherein the bezel is integral to the housing.

10. The wrist-worn electronic device of claim 1, wherein the second antenna is wholly enclosed within the housing.

11. The wrist-worn electronic device of claim 1, wherein the second antenna is partially enclosed within the housing.

12. The wrist-worn electronic device of claim 1, wherein the second antenna includes a metallic trace on a flexible printed circuit.

13. A wrist-worn electronic device comprising:
- a housing including a lower surface configured to contact a wearer's wrist, an opposing upper surface, and an internal cavity;
- a display positioned along the upper surface of the housing;
- a location determining element configured to process a location signal to determine a current geolocation of the electronic device; and
- a first antenna positioned on the upper surface of the housing electrically connected to a second antenna positioned at least partially within the internal cavity such that the first antenna and the second antenna collectively form a single antenna configured to receive the location signal from a satellite-based positioning system and communicate the location signal to the location determining element; and
- an electrical wire electrically connecting the first antenna to the second antenna.

14. The wrist-worn electronic device of claim 13, wherein the electrical wire passes through the housing.

15. The wrist-worn electronic device of claim 13, wherein the second antenna includes a metallic trace on a flexible printed circuit.

16. The wrist-worn electronic device of claim 13, further comprising an annular bezel with an outer diameter and an inner diameter, the bezel positioned on the upper surface of the housing along a perimeter of the display, wherein the first antenna is integrated with at least a portion of the bezel.

17. The wrist-worn electronic device of claim 16, wherein the first antenna has an outer diameter and an inner diameter approximately equal to the outer diameter and the inner diameter of the bezel, but having a length that is less than a circumference of the bezel.

18. The wrist-worn electronic device of claim 13, wherein the bezel is integral to the housing.

19. The wrist-worn electronic device of claim 13, wherein the second antenna is partially enclosed within the housing.

20. The wrist-worn electronic device of claim 13, wherein the second antenna includes a metallic trace on a flexible printed circuit.

* * * * *